(12) United States Patent
Licht et al.

(10) Patent No.: US 12,163,234 B2
(45) Date of Patent: Dec. 10, 2024

(54) METHOD AND APPARATUS FOR MAKING CARBON NANOMATERIALS AND METHODS USING LITHIUM-FREE ELECTROLYTES

(71) Applicant: C2CNT LLC, Venice, FL (US)

(72) Inventors: Stuart Licht, Venice, FL (US); Gad Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 17/956,524

(22) Filed: Sep. 29, 2022

(65) Prior Publication Data

US 2023/0099507 A1  Mar. 30, 2023

Related U.S. Application Data

(60) Provisional application No. 63/250,662, filed on Sep. 30, 2021.

(51) Int. Cl.
| | | |
|---|---|---|
| C25B 1/135 | (2021.01) | |
| C25B 9/13 | (2021.01) | |
| C25B 9/17 | (2021.01) | |
| C25B 15/027 | (2021.01) | |
| C25B 15/08 | (2006.01) | |

(52) U.S. Cl.
CPC ............... *C25B 1/135* (2021.01); *C25B 9/13* (2021.01); *C25B 9/17* (2021.01); *C25B 15/027* (2021.01); *C25B 15/083* (2021.01)

(58) Field of Classification Search
CPC .................................................... C25B 1/135
See application file for complete search history.

(56) References Cited

U.S. PATENT DOCUMENTS

| | | | |
|---|---|---|---|
| 2019/0271088 A1* | 9/2019 | Licht | B01J 23/8993 |
| 2020/0032404 A1* | 1/2020 | Licht | C01B 32/15 |
| 2020/0149173 A1* | 5/2020 | Licht | C01B 32/15 |
| 2020/0378014 A1* | 12/2020 | Licht | C25B 1/135 |
| 2021/0305598 A1* | 9/2021 | Hamdan | C25B 9/23 |
| 2021/0387910 A1* | 12/2021 | Licht | C25B 1/135 |

FOREIGN PATENT DOCUMENTS

| | | |
|---|---|---|
| CN | 109735862 B | 4/2020 |
| WO | 2018156642 A1 | 8/2018 |
| WO | 2021087165 A1 | 5/2021 |

OTHER PUBLICATIONS

Chen et al., Electrolysis of Lithium-Free Molten Carbonates, ACS Sustainable Chemistry & Engineering, vol. 9, No. 11, Mar. 2021, pp. 4167-4174 (Year: 2021).*

(Continued)

*Primary Examiner* — Harry D Wilkins, III
(74) *Attorney, Agent, or Firm* — Chamberlain, Hrdlicka, White, Williams & Aughtry; Aly Dossa

(57) ABSTRACT

The embodiments of the present disclosure relate to a method and apparatus for producing a CNM product that may comprise carbon nanotubes (CNTs). The method and apparatus employ carbon dioxide ($CO_2$) and a carbonate electrolyte that is lithium-free as reactants in an electrolysis reaction in order to make CNTs. In some embodiments of the present disclosure, a graphene-defect agent may be introduced into the electrolysis reaction.

17 Claims, 10 Drawing Sheets

(56) References Cited

OTHER PUBLICATIONS

Licht, Stabilization of STEP electrolyses in lithium-free molten carbonates, available online at https://arxiv.org/ftp/arxiv/papers/1209/1209.3512.pdf (accessed on Dec. 5, 2023), 2012 (no month available) (Year: 2012).*
Gakim et al., Production of Carbon via Electrochemical Conversion of CO2 in Carbonates Based Molten Salt, Advanced Materials Research, vol. 1115, Jul. 2015, pp. 361-365 (Year: 2015).*
International Search Report and Written Opinion of the International Searching Authority mailed Mar. 14, 2024, issued in the corresponding PCT Application No. PCT/US2022/045243 (11 pages).

* cited by examiner

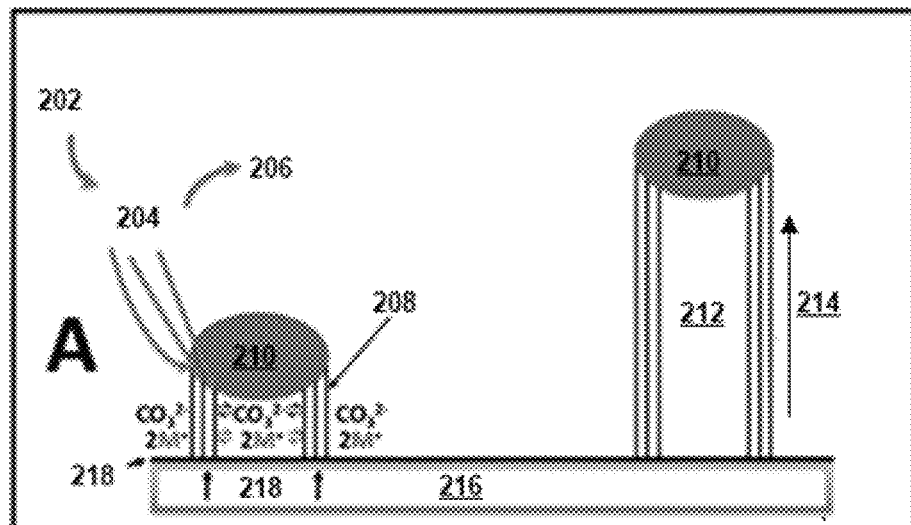
FIG. 2A
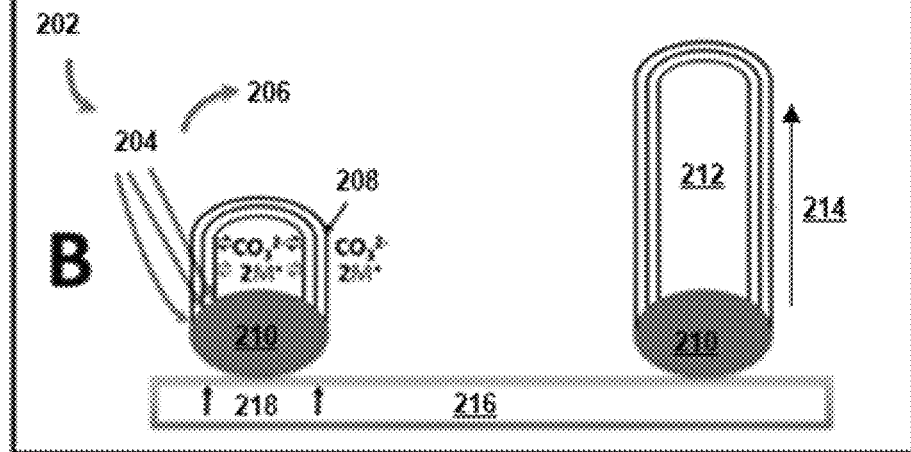
FIG. 2B
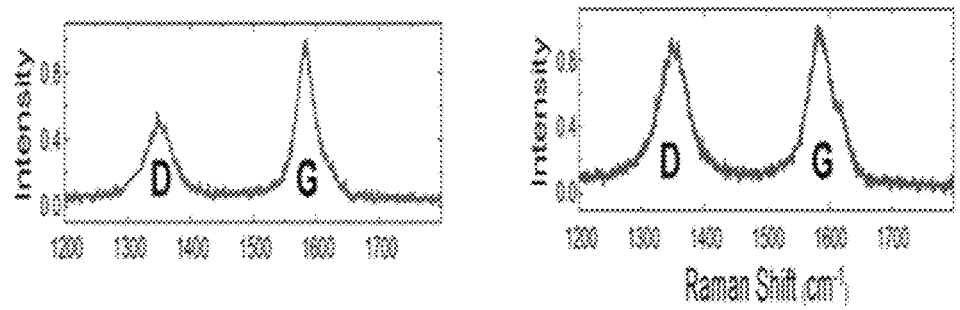
FIG. 2C
FIG. 2

FIG. 3A  FIG. 3B  FIG. 3C
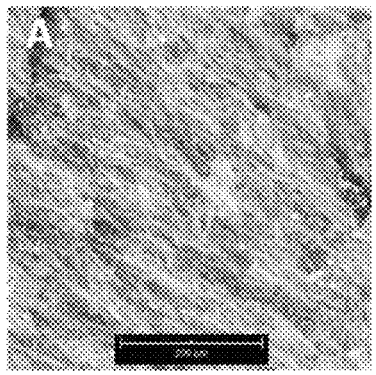 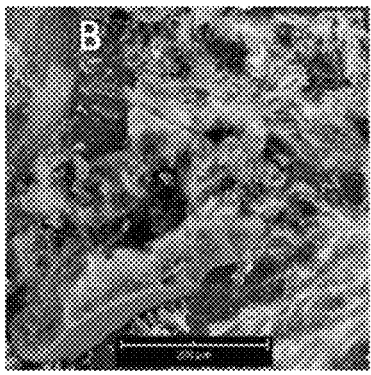 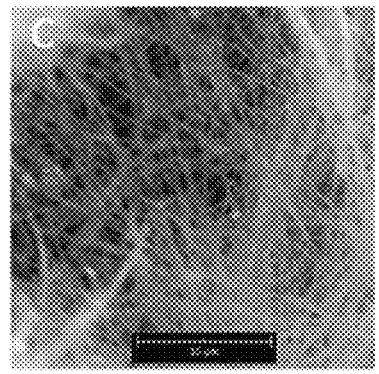
FIG. 3D
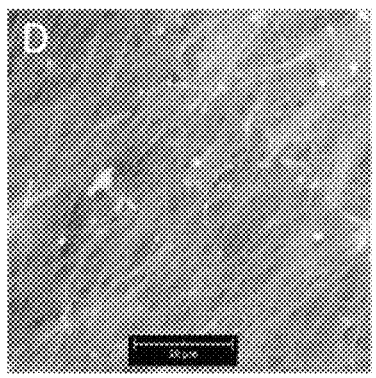 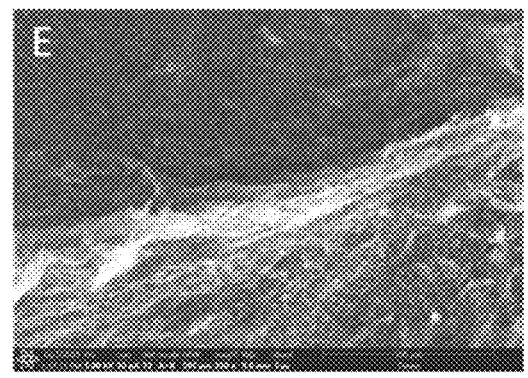
FIG. 3E
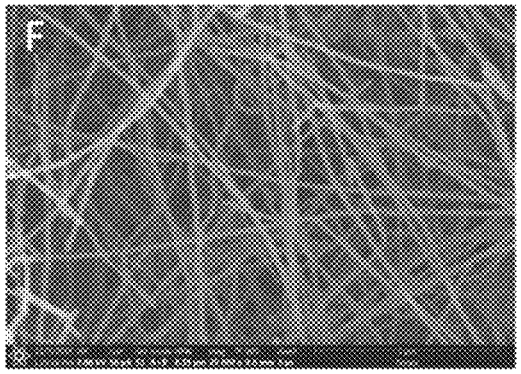 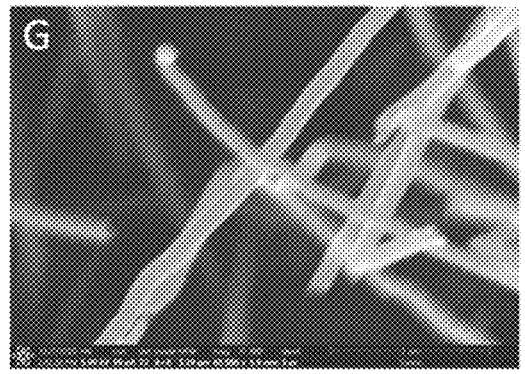
FIG. 3F  FIG. 3G
FIG. 3

FIG. 4A
FIG. 4B
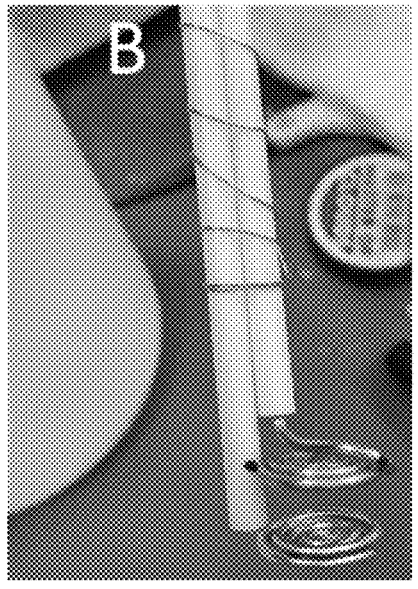
FIG. 4C
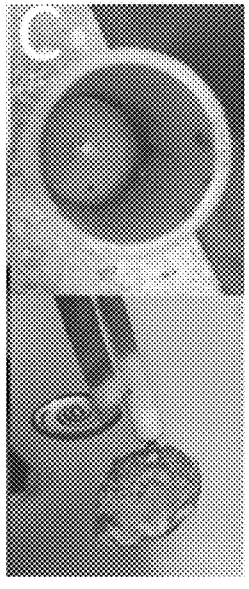
FIG. 4D
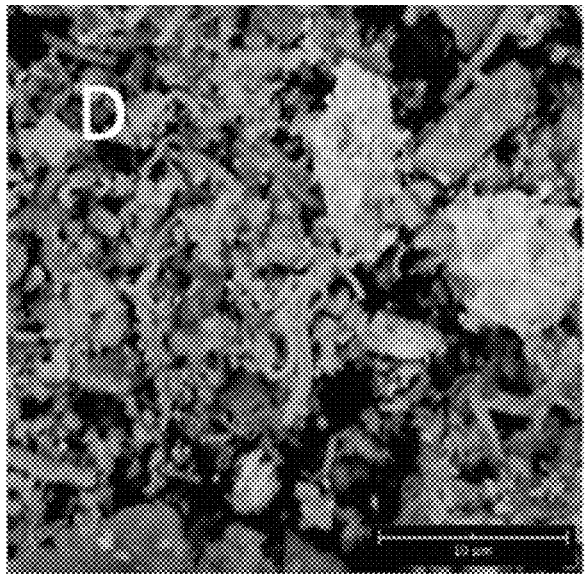
FIG. 4E
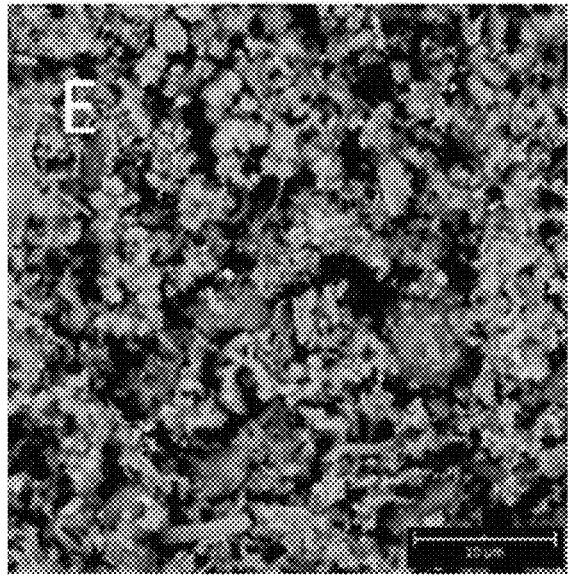
FIG. 4

FIG. 5A
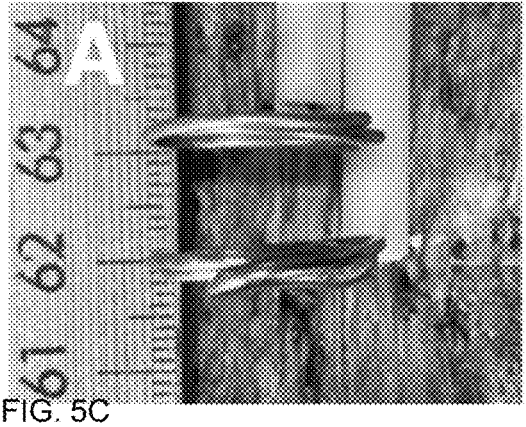
FIG. 5B
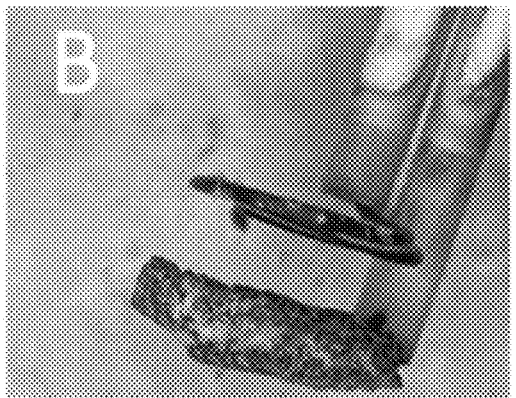
FIG. 5C
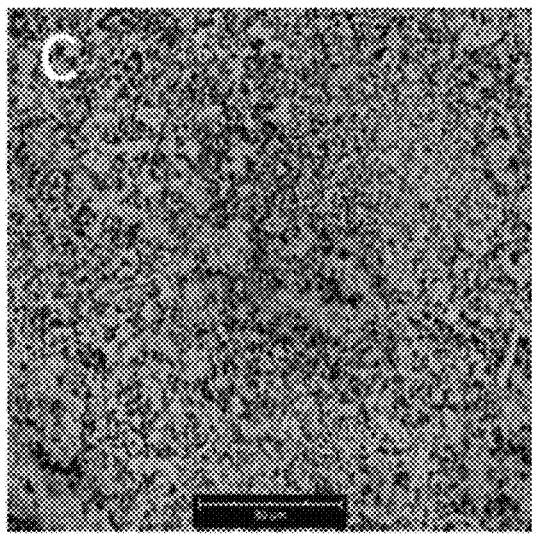
FIG. 5D
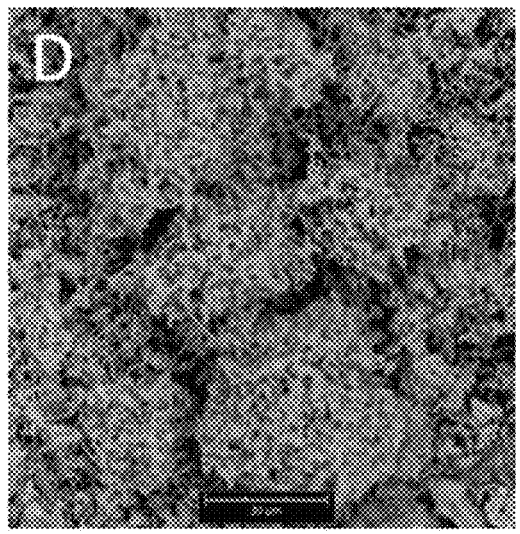
FIG. 5E
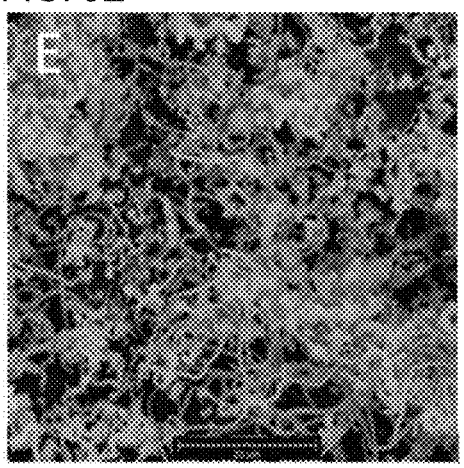
FIG. 5

FIG. 6A    FIG. 6B    FIG. 6C
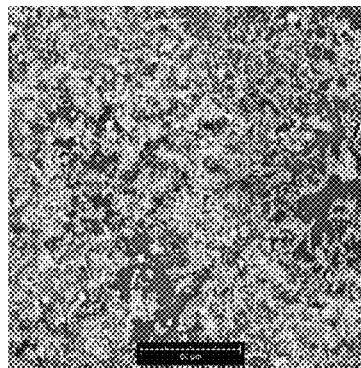 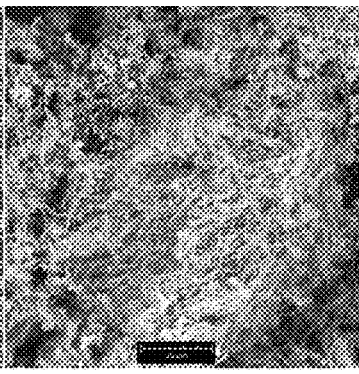 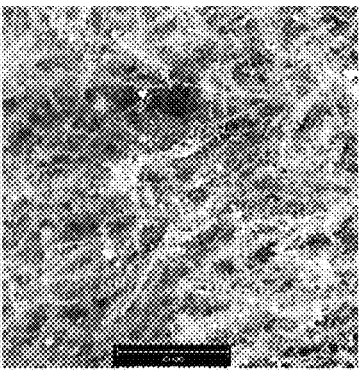
FIG. 6D
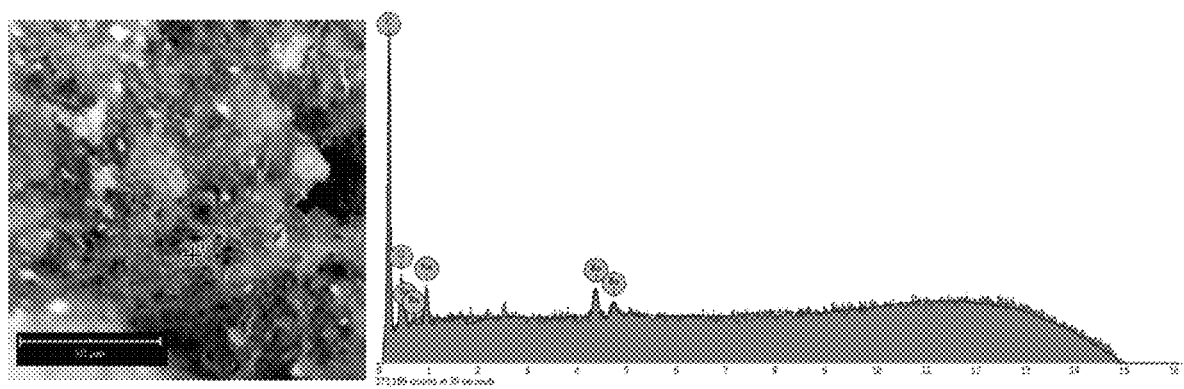
FIG. 6

FIG. 7

METHOD AND APPARATUS FOR MAKING CARBON NANOMATERIALS AND METHODS USING LITHIUM-FREE ELECTROLYTES

CROSS-REFERENCE TO RELATED APPLICATIONS

This application claims priority from U.S. Provisional Patent Application No. 63/250,662 filed Sep. 30, 2021, the entire disclosure of which is incorporated herein by reference.

TECHNICAL FIELD

This disclosure generally relates to production of carbon nanomaterials. In particular, the disclosure relates to methods and apparatus for producing carbon nanomaterials using lithium-free electrolytes.

BACKGROUND

Carbon nanotubes (CNTs) have the highest measured tensile strength (strength 93,900 MPa) of any material. Multi-walled CNTs consist of concentric walls of cylindrical graphene sheets. Graphene is a two-dimensional, honeycomb-structured material formed by a single layer of $sp^2$ hybrid orbital carbon atoms with a thickness of about 0.335 nm, which corresponds to the thickness of one carbon atom. Graphite, nanotubes, and fullerenes can be formed by graphene by, for example, wrapping and stacking.

CNTs have many useful properties including high electrical-conductivity, high thermal-conductivity, flexibility, and they can also be chemically modified. The implication of these useful properties is that CNTs have had a steady rise in their applications. For example, low (typically <<1%) concentrations of CNTs in structural materials can increase the strength of a range of structural materials such as cement, steel, and aluminum. Because each of these materials can have a high carbon-footprint, a carbon composite with increased strength that requires less material may dramatically decrease the carbon-footprint.

A known process by which CNTs are produced is chemical vapor deposition (CVD). However, CVD of CNTs is expensive and has a high carbon-footprint.

In addition to chemical vapor deposition (CVD), electrolysis reactions that use carbon dioxide ($CO_2$) and a lithium-carbonate electrolyte are also known processes for making CNTs. These electrolysis reactions may employ electrolysis potentials of less than 1 volt for splitting $CO_2$ in molten lithium-carbonate solutions to produce uniform CNTs and a carbon nanofiber product at high coulombic efficiency. The $CO_2$ from the atmosphere can be directly converted to CNTs, as confirmed by isotope ($^{13}C$) tracking. The electrolytic splitting of $CO_2$ in molten lithium-carbonate can occur as direct carbon capture and conversion from the air without $CO_2$ pre-concentration, or with exhaust gas $CO_2$, or with concentrated $CO_2$.

These known electrolysis reactions have only been demonstrated when using carbonate electrolytes that include lithium such as pure molten lithium carbonate ($Li_2CO_3$, with a melting point of about 723° C.), or an electrolyte with a substantial fraction of $Li_2CO_3$ mixed with other carbonates such as sodium carbonate ($Na_2CO_3$), potassium carbonate ($K_2CO_3$), magnesium carbonate ($MgCO_3$), calcium carbonate ($CaCO_3$), barium carbonate ($BaCO_3$) or $Li_2CO_3$ mixed with other salts including oxides, borates, sulfates, phosphates or nitrates. It was generally assumed that lithium cations might be a necessary component to make CNTs using molten carbonates and $CO_2$ in an electrolysis reaction. However, the cost of lithium generally results in a high cost of operating these electrolytic reactions and, therefore, further methods and systems for producing graphitic carbon nanomaterials are desirable.

SUMMARY

The embodiments of the present disclosure relate to an electrolysis method and apparatus for producing a carbon nanomaterial (CNM) product that comprises various nanostructures, including carbon nanotubes (CNTs). The method and free employ $CO_2$ and an electrolyte that is lithium-free as reactants in an electrolysis reaction in order to make the CNM product. In some embodiments of the present disclosure, the electrolyte is a binary mixture of two carbonates. In some embodiments of the present disclosure, the electrolyte is a ternary mixture of two carbonates and an oxide. In some embodiments of the present disclosure, the electrolyte is a mixture of more than three components. The embodiments of the present disclosure can cost substantially less than those electrolysis reactions that use an electrolyte that contains lithium.

Some embodiments of the present disclosure relate to a method for making a CNM product. The method comprises the steps of: heating a lithium-free carbonate electrolyte to obtain a molten-carbonate electrolyte that is lithium-free; positioning the molten carbonate electrolyte between an anode and a cathode within an electrolytic cell; employing one or more non-lithium facilitation elements; applying an electrical current to the cathode and the anode in the electrolytic cell; and, collecting a CNM product from the cathode.

In some embodiments of the present disclosure, the step of employing one or more non-lithium facilitation elements may refer to either adding one or more further chemical constituents, or to altering one or more reaction conditions, or operational conditions, to modify the electrical current or both of adding a further chemical constituent or altering one or more conditions.

In some embodiments of the present disclosure, the non-lithium facilitation element is one or more of: (i) enhancing transition metal nucleation by adding one or more transition metal nucleation agents, (ii) adding one or more defect inducing agents, (iii) reducing or removing an electrolyte conductivity impediment element, or any combinations thereof. In some embodiments, enhancing transition metal nucleation may occur by adding one or more transition metal nucleation reagents. In some embodiments, the addition of a defect inducing agents may be by the addition of one or more chemical agents that may induce tetrahedral $sp^3$ graphene defects. Induced defects in the graphene walls of the CNTs during synthesis may provide a mechanism by which larger cations may be used in a stable and high-yield $CO_2$ electrolysis process to make CNTs and other CNM products. In some embodiments, the removal of the electrolyte conductivity impediment element may refer to changing the voltage, current, and/or current density to enhance electrical conductivity.

Some embodiments of the present disclosure relate to methods for selecting one or more structures of the CNM product. For example, some embodiments of the present disclosure relate to methods for producing CNM products that comprise graphitic structures within the CNM product. For example, graphitic CNM product comprises structures that include: a CNT, a carbon platelet structure, a graphene structure, a nano-onion structure, a nano-sphere structure, a hollow nano-sphere structure or any combinations thereof. By using the embodiments of the present disclosure, the CNM product can be made up of some, most, substantially all or all of the selected one or more graphitic structures.

Some embodiments of the present disclosure relate to an apparatus that is an electrolytic cell for making one or more CNM products. The electrolytic cell comprises one or more walls that define a plenum and an anode and a cathode that are positioned within the plenum. The plenum is configured to receive and hold a molten, lithium-free carbonate electrolyte between the anode and the cathode. The electrolytic cell may be further configured to receive a graphene-defect agent, a nanomaterial selection component and an electrical current that is applicable to the anode and the cathode to initiate an electrolysis reaction for making a CNM product.

In some embodiments of the present disclosure, the anode and cathode of the electrolytic cell are generally aligned with a horizontal plane and they are vertically spaced apart from each other.

Without being bound by any particular theory, it is known that when graphene is made it can include various defects, including intrinsic defects and extrinsic defects. Intrinsic defects may consist of non-$sp^2$ orbital hybrid carbon atoms being present in the graphene, which often results in the existence of non-hexagonal rings surrounded by hexagonal rings. Reported intrinsic defects of graphene include Stone-Wales defects, single vacancy defects, multiple vacancy defects, line defects and carbon adatoms. Extrinsic defects may perturb the crystalline order of the graphene by including non-carbon atoms. Reported extrinsic defects of graphene include foreign adatoms and substitutional impurities.

Some embodiments of the present disclosure relate to leveraging defects in the graphene of the CNT walls to allow larger cation flow through the graphene to facilitate CNT growth during a $CO_2$ electrolysis reaction. Without being bound by any particular theory, any induced defects or vacancies could enhance the graphene porosity, but some embodiments of the present disclosure more specifically relate to tetrahedral $sp^3$ graphene defects. Tetrahedral $sp^3$ graphene defects may be induced by the presence of a graphene-defect agent, such as an oxide, during a $CO_2$ electrolysis reaction. Graphene sheet "vacancies" are known to enhance the degree of lithium cation intercalation and to increase the capacity of lithium-cation anode battery storage. Graphene vacancies and oxide-induced defects in graphene may allow the intercalation of not only Li-cations into graphene, but also larger cations such as sodium cations, magnesium cations and calcium-cations. As such, induced defects in the graphene walls of the CNTs during their synthesis may provide a mechanism by which cations other than lithium may be used in a stable and high-yield $CO_2$ electrolysis process to make CNTs. In some embodiments, the introduction of oxides at high concentrations may induce greater defects in the growing CNM product.

Some embodiments of the present disclosure relate to the addition of transition metal nucleating agents to a lithium-free electrolyte.

Some embodiments of the present disclosure relate to the use of low current density to control conductivity during formation of the CNM product.

Some embodiments of the present disclosure relate to a system for synthesizing a CNM product in a lithium-free environment. The system comprises a heater for heating a lithium-free carbonate electrolyte to obtain a molten carbonate electrolyte; an electrolytic cell for receiving or housing the molten carbonate electrolyte between an anode and a cathode in an electrolytic cell; one or more non-lithium facilitation elements; and a source of electrical current for applying an electrical current to the cathode and the anode in the electrolytic cell. Without being bound by any particular theory, the systems of the present disclosure may employ the electrolytic cell apparatus described herein. Without being bound by any particular theory, the systems of the present disclosure may be configured to perform the methods described herein.

By using $CO_2$ from the atmosphere as a reactant in the electrolysis reactions of the present disclosure, embodiments of the present disclosure can decrease the greenhouse gas footprint of processes and systems that make CNTs and other CNM products. By using a lithium-free carbonate electrolyte, the costs of making valuable CNM products may be significantly reduced.

BRIEF DESCRIPTION OF THE DRAWINGS

These and other features of the present disclosure will become more apparent in the following detailed description in which reference is made to the appended drawings.

FIG. 2 shows two schematics that represent proposed carbon nanotube (CNT) growth mechanisms upon a cathode during a carbon dioxide ($CO_2$) electrolysis reaction, wherein FIG. 2A shows a tip growth mechanism; FIG. 2B shows a root growth mechanism; and FIG. 2C shows Raman spectra of the electrolysis-grown carbon nanotube product from an electrolyte with $Li_2O$ (right) and without $Li_2O$ (left).

FIG. 3 shows scanning electron microscopy (SEM) images and high resolution SEM images of portions of a carbon nanomaterial (CNM) product made using a lithium carbonate electrolyte, wherein FIG. 3A is an SEM image at a first magnification; FIG. 3B is another SEM image at the first magnification; FIG. 3C is an SEM image at a second, higher magnification; FIG. 3D is another SEM image at the second magnification; FIG. 3E is a high resolution SEM image at the first magnification; FIG. 3F is a high resolution SEM image at a fourth, higher magnification; and, FIG. 3G is a high resolution SEM image at a fifth, higher magnification.

FIG. 4 shows photographs of a portion of the electrolytic cell and SEM images of portions of the CNM product made therein by an electrolysis reaction, according to embodiments of the present disclosure, wherein FIG. 4A is a photograph of an anode and cathode set that are arranged vertically apart from each other and a vessel that forms part of the electrolytic cell; FIG. 4B is another photo of the anode and cathode that are vertically positioned apart from each other; FIG. 4C shows the interior walls of the vessel and the anode and cathode following the electrolysis reaction; FIG. 4D is an SEM image of a portion of the CNM product at the second magnification; and, FIG. 4E is another SEM image of a portion of the CNM product at the second magnification.

FIG. 5 shows photographs of the anode and a cathode and SEM images of the CNM product made according to embodiments of the present disclosure, wherein FIG. 5A is a photograph of the vertical arrangement of the anode and cathode prior to an electrolysis reaction, according to embodiments of the present disclosure; FIG. 5B is a photograph of the anode and cathode of FIG. 5A following the electrolysis reaction; FIG. 5C shows an SEM image of a portion of the CNM product at a sixth magnification; FIG. 5D shows an SEM image of a portion of the carbon nanomaterial at a seventh magnification; and FIG. 5E shows a portion of the carbon nanomaterial at an eighth magnification.

FIG. 6 shows SEM images of the product of electrolysis at 770° C. in a 1:1 wt % $Na_2CO_3$:$BaCO_3$, electrolyte current density of 0.05 $A/cm^2$, with a planar nichrome anode and a planar brass cathode, wherein FIG. 6A is an SEM image at a first magnification, FIG. 6B is an SEM image at a second magnification, and FIG. 6C is an SEM image at a third magnification. FIG. 6D is the product energy-dispersive X-ray spectrum showing 92.2% C, 3.6% Ba and 4.2%.

FIG. 7 shows SEM images of the washed product of electrolysis in a 770° C. 1:1 wt % $Na_2CO_3$ to $BaCO_3$, electrolyte at 0.2 $A/cm^2$ with 0.08 wt % $Fe_2O_3$ with a nichrome anode and a brass cathode, wherein

FIG. 9 shows SEM images of the washed product of electrolysis in a 770° C. 1:1 wt % $Na_2CO_3$ to $BaCO_3$, electrolyte at 0.1 $A/cm^2$ with 0.04 wt % $Fe_2O_3$ with 0.04 wt % $Cr_2O_3$ with a nichrome anode and a Monel cathode, wherein FIG. 9A is an SEM image at a first magnification, and FIGS. 9B and 9C are SEM images at a second magnification.

FIG. 10 shows SEM images of the washed product of electrolysis in a 770° C. 1:1 wt % $Na_2CO_3$ to $BaCO_3$, electrolyte at 0.1 $A/cm^2$ with 30 wt % BaO with a nichrome anode and a Monel cathode, wherein FIG. 10A is an SEM image at a first magnification, FIG. 10B is an SEM image at a second magnification, and FIG. 10C is an SEM at a third magnification.

DETAILED DESCRIPTION

Figure 1:
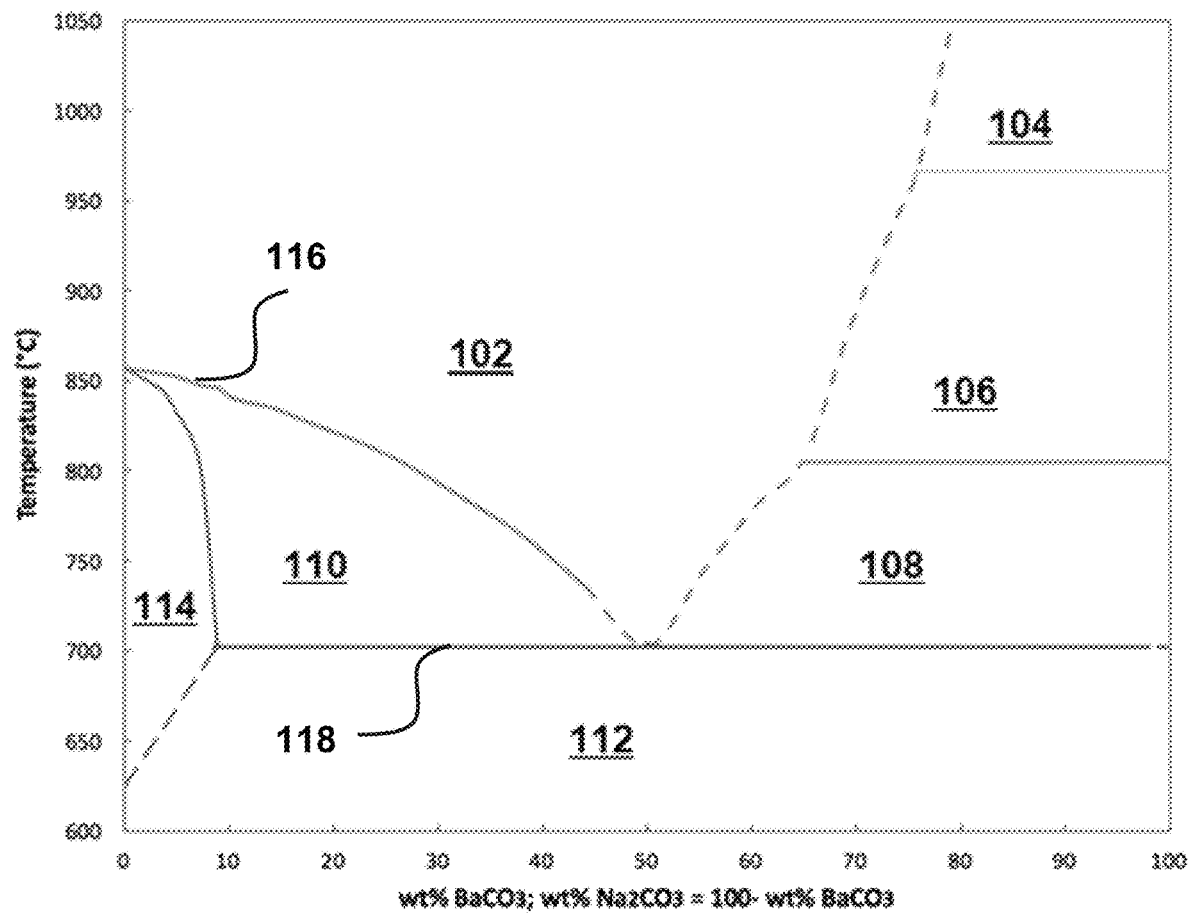
FIG. 1 is a phase diagram of sodium carbonate ($Na_2CO_3$) and barium carbonate ($BaCO_3$) mixtures some of which are for use as a lithium-free carbonate electrolyte mixture in embodiments of the present disclosure.
Figure 7A:
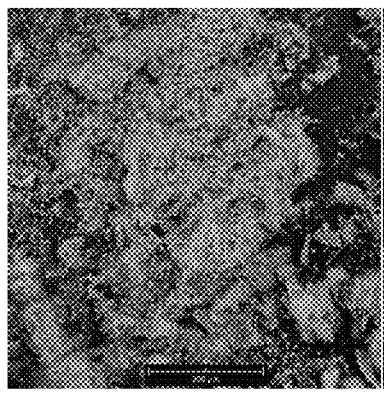
FIG. 7A is an SEM image at a first magnification.
Figure 7B:
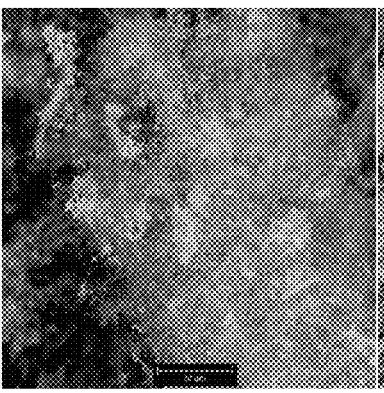
FIG. 7B is an SEM image at a second magnification.
Figure 7C:
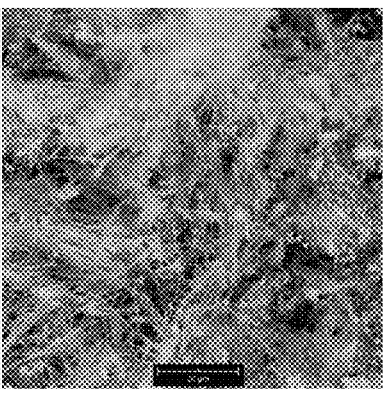
FIGS. 7C and 7D are SEM images at a third magnification.
Figure 7D:
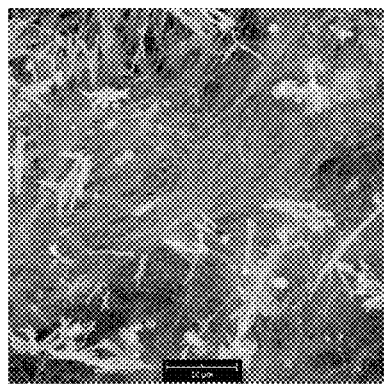
Figure 7E:
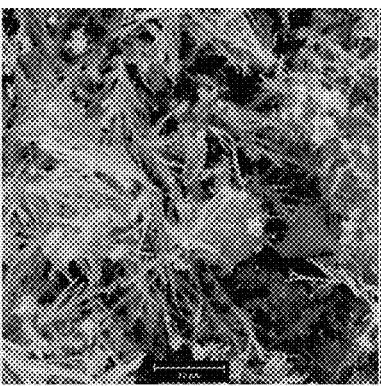
FIG. 7E is an SEM image at a fourth magnification.
Figure 7F:
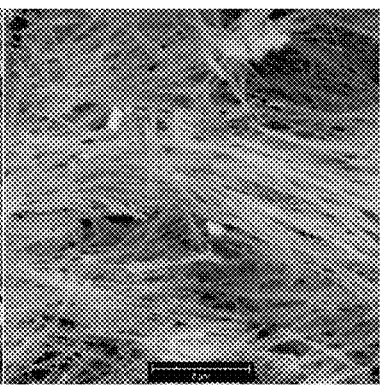
FIG. 7F is an SEM image at a fifth magnification.

The embodiments of the present disclosure relate to methods and apparatus for producing a carbon nanomaterial (CNM) product that comprises graphitic carbon structures of the nanoscale, such as carbon nanotubes (CNTs). The methods and apparatus employ carbon dioxide ($CO_2$) as a reactant in an electrolysis reaction in order to make the CNM product. The embodiments of the present employ an electrolyte that is free of lithium.

Some embodiments of the present disclosure relate to methods that employ an electrolysis reaction for making a CNM product. The electrolysis reaction occurs in an environment with a molten, lithium-free electrolyte that is positioned between an anode and a cathode. Carbon is introduced into the molten electrolyte, as either pure $CO_2$, concentrated $CO_2$, $CO_2$ that is entrained in atmospheric air, another carbon-containing gas or other anthropogenic sources of $CO_2$.

Some embodiments of the present disclosure relate to an apparatus and a system that employs the apparatus. The apparatus comprises an electrolytic cell that includes an anode and a cathode. In some embodiments of the present disclosure, the anode and cathode are arranged vertically spaced apart from each other.

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

As used herein, the expression "lithium free" means substantially free of lithium and it also contemplates when small amounts of lithium may be present, or when no detectable amounts of lithium are present. In some embodiment of the present disclosure, a lithium-free carbonate electrolyte is useful and which may also be referred to as "predominantly non-lithium carbonate electrolyte". For clarity the expressions "lithium-free carbonate electrolyte", "lithium-free electrolyte", "predominantly non-lithium carbonate electrolyte" and "predominantly non-lithium electrolyte" are used here in to refer to an electrolyte in which there is no detectable amount of lithium and where a small amount of lithium is present when the electrolyte is a mixture and the lithium-containing component forms less than about 5% on a weight basis (wt %) of the entire mixture or less than about 4 wt %, less than about 3 wt %, less than about 2 wt %, less than about 1 wt %, less than about 0.5 wt %, less than about 0.25 wt %, less than about 0.1 wt %, less than about 0.05 wt %, or less than about 0.025 wt % or less than about 0.01 wt % of the entire mixture.

Embodiments of the present disclosure will now be described and include references to the Examples and the figures.

Some embodiments of the present disclosure relate to a method for producing a CNM product that comprises CNTs. The method comprises the steps of heating a lithium-free carbonate electrolyte to obtain a molten-carbonate electrolyte that is lithium free; positioning the molten carbonate electrolyte between an anode and a cathode in an electrolytic cell; applying an electrical current to the cathode and the anode in the electrolytic cell; and, collecting a CNM product from the cathode. In some embodiments of the present disclosure, the method further comprises a step of employing one or more non-lithium facilitation elements and/or a step of introducing a graphene-defect agent into the lithium-free carbonate electrolyte. In some embodiments of the present disclosure, the CNM product is doped or magnetic or not.

The step of heating the lithium-free carbonate electrolyte can be achieved by various means, as would be appreciated by the skilled reader. For example, a heating apparatus such as an oven or furnace can be used to heat the electrolyte to a sufficient temperature so that it transitions into a molten, liquid state. As such, any heating apparatus that can achieve the temperatures required to heat the electrolyte to its melting point are contemplated herein.

In some embodiments of the present disclosure, the lithium-free electrolyte can be a binary mixture, a ternary mixture or a mixture of more than three components. For example, the binary mixture may comprise two components selected from: sodium carbonate, calcium carbonate, and barium carbonate. A ternary mixture may comprise two lithium-free carbonates and a graphene-defect agent.

Without being bound by any particular theory, the reduction of $CO_2$ in a lithiated carbonate electrolyte is a $4e^-$ process that proceeds in accordance with Equation 1 (EQN. 1):

$$Li_2CO_{3(molten)} + 4e^- \rightarrow C_{(nanomaterial;)} + O_{2(gas)}$$
$$Li_2O_{(dissolved)} \qquad \text{(EQN. 1).}$$

Without being bound by any particular theory, $CO_2$ added to the electrolyte chemically reacts with lithium oxide to renew and reform $Li_2CO_3$ in accordance with Equation 2 (EQN. 2):

$$CO_{2(atmospheric\ or\ stack)} + Li_2O_{(dissolved)} \leftrightarrows Li_2CO_{3(molten)} \qquad \text{(EQN. 2).}$$

Without being bound by any particular theory, when EQN. 1 is combined with EQN. 2 yields a net electrolysis reaction, in accordance with Equation 3 (EQN. 3):

$$CO_{2(gas)} + 4e^- C_{(nanomaterial)} + O_{2(gas)} \qquad \text{(EQN. 3).}$$

Without being bound by any particular theory, at temperatures higher than about 800° C., a two, rather four, electron reduction can increasingly dominate, and by about 950° C., the electrolysis product is pure carbon monoxide, rather than carbon, in accordance with Equation 4 (EQN. 4):

$$CO_{2(gas)} + 2e^- \rightarrow CO_{(gas)} + \tfrac{1}{2}O_{2(gas)} \qquad \text{(EQN. 4).}$$

A ternary Li, Na, and K carbonate eutectic mixture has a melting point below 400° C. The potassium component of the electrolyte has been observed to inhibit carbon nanomaterial formation and, as such, under some conditions potassium may not be a desirable component of the lithium-free carbonate electrolyte. Below about 600° C. the electrolysis reaction products in the ternary carbonate electrolyte are largely amorphous carbon and platelets arranged in a 1 to 2 μm "honeycombed" morphology. Above about 600° C. the electrolysis carbon product increasingly exhibits a mix of CNM products.

Without being bound by any particular theory, the embodiments of the present disclosure relate to electrolytes that are: (i) lithium free (to decrease the overall costs) and potassium free (to allow carbon nanomaterials to form); (ii) molten and stable between about 700° C. and about 800° C.; (iii) able to readily dissolve oxides; and, (iv) inexpensive compared to lithium carbonate. Sodium carbonate has a high melting point of about 851° C. Calcium carbonate can become unstable at those temperatures and it can decompose into calcium oxide and $CO_2$. Barium carbonate also has a melting point above 810° C.; both sodium carbonate and barium carbonate are an order of magnitude less expensive than lithium carbonate.

A $Na_2CO_3$—$BaCO_3$ binary mixture has been studied and an example of a $Na_2CO_3$—$BaCO_3$ phase diagram is shown in FIG. 1. As seen in FIG. 1, a eutectic mixture may be composed of approximately 50 wt % $BaCO_3$, or more precisely 34.6 mole % $BaCO_3$. This 50 wt % $BaCO_3$/$Na_2CO_3$ eutectic mix has a melting point of about 702±2° C. The horizontal x-axis of the phase diagram in FIG. 1 shows the wt % $BaCO_3$, wherein wt % $Na_2CO_3$ equals to 100%−wt % $BaCO_3$. The vertical y-axis of the phase diagram in FIG. 1 shows the temperature in degree Celsius (° C.). The top line 116 shows the melting points of $BaCO_3$/$Na_2CO_3$ eutectic mix at various wt % $BaCO_3$ and in particular. The bottom line 118 shows the melting point being consistent at about 702±2° C. The area 102 shows the liquid state of the $Na_2CO_3$—$BaCO_3$ mixtures. The area 104 shows the liquid state and γ-$BaCO_3$. The area 106 shows the liquid state and β-$BaCO_3$. The area 108 shows the liquid state and γ-$BaCO_3$. The area 112 under the about 702±2° C. melting point shows the solid state of $Na_2CO_3$ and γ-$BaCO_3$. The area 110 shows the solid state and liquid state before 50% wt % $BaCO_3$ and under about 850° C. The area 114 shows the solid solution state before 10% wt % $BaCO_3$.

The molten electrolyte is then positioned between an anode and a cathode within an electrolytic cell. The electrolytic cell may be any type of vessel that can maintain its structural integrity in the face of the electrochemical environment that occurs during the electrolysis reactions of the present disclosure. The electrolytic cell may have one or more walls that may be made of a desired material or that are coated with a desired material that will not degrade in the environment of the electrolysis reaction. In some embodiments of the present disclosure, the electrolytic cell is made of substantially pure alumina. In some embodiments of the present disclosure, the electrolytic cell is a tubular vessel with a closed end.

In some embodiments of the present disclosure, the electrolyte may be melted inside the electrolytic cell or it may be melted outside the cell and transferred thereto. Because the electrolysis reaction will typically occur over a time period whereby the molten electrolyte could cool, the electrolytic cell can be configured with its own integral heating apparatus, such as an integral heater, or it may be configured to be heated by an external heater that is external to the electrolytic cell so that the electrolyte is maintained in the molten state for the desire period of time.

In some embodiments of the present disclosure, the electrolytic cell maybe configured to maintain the electrolyte at least at about 650° C., at least at about 675° C., at least at about 700° C., at least at about 725° C., at least at about 750° C., at least at about 775° C., at least at about 800° C., at least at about 825° C., at least at about 850° C., at least at about 875° C., at least at about 900° C., at least at about 1000° C. or great than 1000° C.

The anode can be made of various metals or alloys. Some anodes can be made of materials that comprise nickel. Some non-limiting examples of suitable materials for the anodes of the present disclosure include: substantially pure nickel, an alloy that is comprised of substantially mostly nickel, an alloy that is comprised of some nickel. For example, Inconel 718 or other Inconels, such as, but not limited to Inconel 600 and Inconel 625, Nichrome A (composed of about 80% nickel and about 20% chromium), Nichrome C (composed of nickel, iron and chromium), Incoloy alloy (such as Incoloy 800 composed of about 40% iron, about 30-35% nickel and about 19-23% chromium).

The anode may be planar in shape and it can be made of various dimensions. In some embodiments of the present disclosure, the anode may be made of wire that is rolled into a substantially flat coil with an upper face and a lower face. The upper and lower faces of the coiled anode may have substantially equal areas that are suitable for fitting within the electrolytic cell. In some embodiments, the coiled anode faces have an area that is between about 1 cm$^2$ and about 20 cm$^2$; between about 2 cm$^2$ and 10 cm$^2$; or between about 3 cm$^2$ and about 5 cm$^2$. The skilled person will appreciate that the size of the electrolytic cell may dictate the size of the coiled anode. The coiled anode may be arranged to be generally aligned with a horizontal plane.

The cathode can be made of various metals or alloys. Some cathodes can be made of materials that comprise steel, galvanized steel, copper, or any combinations thereof. Some further non-limiting examples of suitable materials for the anodes of the present disclosure include: Monel and brass.

The cathode may be planar in shape and can be made of various dimensions. In some embodiments of the present disclosure, the cathode may be made of wire that is rolled into a flat coil with an upper face and a lower face. The upper and lower faces of the coiled cathode may have substantially equal areas that are suitable for fitting within the electrolytic cell. In some embodiments, the coiled cathode faces have an area that is between about 1 $cm^2$ and about 20 $cm^2$; between about 2 $cm^2$ and 10 $cm^2$; or between about 3 $cm^2$ and about 5 $cm^2$. The skilled person will appreciate that the size of the electrolytic cell may dictate the size of the coiled cathode. The coiled cathode may be arranged to be generally aligned with a horizontal plane.

In some embodiments of the present disclosure, the size and orientation of the cathode can be selected to substantially mirror the size and orientation of the anode. In some embodiments of the present disclosure, the anode and the cathode may be generally aligned with a horizontal plane and vertically spaced apart from each other. As the skilled person will appreciate, the distance between the electrodes must permit the passage of sufficient electric current therebetween but the amperage of the electric current and the size of the electrolytic cell may also influence how far apart the electrodes are vertically spaced apart. In some embodiments of the present disclosure, the electrodes maybe vertically spaced apart from each other by about 0.25 cm, about 0.5 cm, about. 0.75 cm, about 1 cm, about 1.25 cm, about 1.5 cm, about 1.75 cm, about 2 cm, about 3 cm, about 4 cm, about 5 cm, about 7.5 cm, about 10 cm or further.

In order to initiate and maintain the electrolysis reaction within the electrolytic cell, an electric current is applied and passes between the anode and cathode via the molten electrolyte therebetween. In some embodiments of the present disclosure, the electric current may be an alternating current or a direct current. In some embodiments of the present disclosure, the current may be between about 0.01 amps (A) and about 5 amps. In some embodiments of the present disclosure, the current may be between about 0.025 A and about 4 A; between about 0.05 A and about 3 A; between about 0.075 A and about 2 A; between about 0.1 A and about 1 A. In some embodiments of the present disclosure the current is about 0.5 A.

In some embodiments of the present disclosure, the current is applied at a substantially constant current density. For example, the current density of the applied current may be between about 0.01 $A/cm^2$ and about 1 $A/cm^2$. In some embodiments the current density of the applied current may be between about 0.025 $A/cm^2$ and about 0.75 $A/cm^2$; between about 0.05 $A/cm^2$ and about 0.5 $A/cm^2$; between about 0.075 $A/cm^2$ and about 0.25 $A/cm^2$; or between about 0.01 $A/cm^2$ and about 0.1 $A/cm^2$. In some embodiments of the present disclosure, the current density is about 0.1 $A/cm^2$. In some embodiments, low current density is used to control conductivity during formation of the CNM product.

In some embodiments of the present disclosure, the method further comprises the step of employing one or more non-lithium facilitation elements. In some embodiments of the present disclosure, the one or more non-lithium facilitation elements may comprise: (i) enhancing transition metal nucleation, ii) adding one or more defect inducing agents, (iii) reducing or removing an electrolyte conductivity impediment element, and (iv) any combination thereof.

In some embodiments of the present disclosure, the step of enhancing transition metal nucleation may comprise adding a transition metal nucleating agent to the lithium-free electrolyte, either before, during or after the heating step. In some embodiments, the transition metal oxide may be iron oxide ($Fe_2O_3$), chromium oxide ($Cr_2O_3$), or a combination thereof. In a particular embodiment, the transition metal nucleating agent is $Fe_2O_3$. In some embodiments, the transition metal nucleating agent may be a transition metal salt of one or more of an iron, chromium, nickel, copper, manganese, titanium, zirconium, molybdenum, tantalum, tungsten, silver, cadmium, tin, ruthenium, vanadium, or cobalt salt. In some embodiments, the transition metal nucleating agent may be a transition metal oxide.

In some embodiments of the present disclosure, the step of adding on or more defect inducing agents comprises a step of introducing a graphene-defect agent into the lithium-free carbonate electrolyte, either before, during or after the heating step. This adding step can be achieved by various approaches, depending on what the nature of the graphene-defect agent is. For example, the graphene-defect agent may be a chemical, a mechanical element, an optical element, a physical element or any combination thereof that induces graphene defects and/or graphene vacancies in graphitic structures of the CNM product. This step of introducing the graphene-defect agent into the lithium-free carbonate electrolyte can occur before, during or after the lithium-free carbonate electrolyte is heated to a molten state.

In some embodiments of the present disclosure, the graphene defects are localized within a graphene component of the graphitic structures within the CNM product and the defects are intrinsic, extrinsic or any combination thereof.

Examples of intrinsic graphene defects are Stone-Wales defects, single vacancy defects, multiple vacancy defects, line defects, the inclusion of carbon adatoms or any combination thereof.

Examples of extrinsic graphene-defects are the inclusion of foreign adatoms or substitutional impurities.

In adatom defects, oxygen may attach to the surface of the CNT or other carbon nanomaterials and disrupt the bonding, or may replace carbon in the structure itself.

In some embodiments of the present disclosure, the graphene-defect agent is an oxide. The oxide may be introduced into the lithium-free carbonate electrolyte by adding a chemical oxide, by a chemical reaction caused by a change in the temperature of the molten carbonate electrolyte, by degradation of the electrodes, by oxidation of the anode or any combination thereof.

Suitable examples of chemical oxides that may be added into the lithium-free carbonate electrolyte include, but are not limited to: an alkali oxide, an alkali earth oxide, a metal oxide, a non-metal oxide or any combination thereof. In some embodiments of the present disclosure, sodium oxide ($Na_2O$), barium oxide (BaO), calcium oxide (CaO), aluminum oxide ($Al_2O_3$) or any combination thereof are added to the lithium-free carbonate electrolyte. Combinations may also be added as reorganized oxide salts, for example, without being limited to, sodium or barium aluminate. In some embodiments of the present disclosure, the oxide is one or more of barium oxide, sodium oxide or calcium oxide. In some embodiments of the present disclosure, the oxide is iron or cobalt oxide. In some embodiments of the present disclosure, the oxide is lithium oxide at 5 percent or less concentration.

In the process of a $CO_2$ molten carbonate electrolysis reaction, small transition metal "seeds" have been observed at the ends of the CNT product, and it was shown that the mechanism of molten carbonate CNT growth may be activated by both tip and root transition metal nucleation processes. Without being bound to any theory, the mechanistic concept that graphene defects or vacancies may facilitate CNT growth in lithium-free molten carbonate electrolytes can be seen in FIG. 2. In FIG. 2A, the catalyst tip can move along with the CNT growth. In FIG. 2B, the catalyst is at the stationary root or base from which the CNT grows.

SEM evidence of both tip and root growth CNT has been observed. FIG. 2 shows two schematics that represent proposed carbon nanotube (CNT) growth mechanisms upon a cathode during a carbon dioxide ($CO_2$) electrolysis reaction, wherein FIG. 2A shows a $CO_2 \rightarrow CNT+O_2$ electrolysis tip growth mechanism and FIG. 2B shows $CO_2 \rightarrow CNT+O_2$ a root growth mechanism. The top arrow 202 of FIG. 2A represents $CO_2$ dissolution reaction in molten carbonate represented by the equation: $CO_{2(gas)} + M_2O_{(dissolved)} \rightarrow 2M^+_{(molten)} + CO_3^{2-}{}_{(molten)}$. The arrow 204 represents the net cathode reaction, represented by the equation: $2M^+ + CO_3^{2-} + 4e^- \rightarrow{}^{C+M_2O+}{}_2 O^{2-}$. The arrow 206 represents the net anode reaction, represented by the equation: $2O^{2-} \rightarrow O_2 + 4e^-$. For both FIG. 2A and FIG. 2B, there are $sp^3$ oxide induced graphene defects, wherein low M=$Li^+$; and high M=$Li^+$ or $Na^+$. For FIG. 2A, the metal catalyst 210 is at the tip of the CNT cylindrical graphene walls 208 of a carbon nanotube 210, which is above a layered graphene 218. For FIG. 2B, the metal catalyst 210 is at the bottom of the CNT cylindrical graphene walls 208 of a carbon nanotube 210, closer to the cathode 216. In both FIG. 2A and FIG. 2B, the growth direction is represented by arrow 214 and the double arrows 218 pointing upwards represent $4e^-$.

Without being bound by any particular theory, the carbonate species, generated from the continuous $CO_2$ renewal of the carbonate electrolyte, provide the ongoing carbon building blocks of CNT walls, and the carbonate reduction to carbon occurs at a metal catalyst interface with the growing CNT cylindrical graphene walls. However, carbonate must have easy access not only to the interface with the outer CNT walls, but also to interface with the inner CNT walls. Carbonate movement to the interior of the growing carbon nanotube may be inhibited by charge buildup. This charge buildup may be reduced if cations also have easy access to the interior walls. The lithium cation is a small cation, and requires relatively few defects or vacancies in the growing cylindrical carbon nanotube walls to access the interior regions of the CNT. However, a higher number of defects is required to facilitate ions larger than lithium cations to transfer through the CNT walls. A higher number of defects may be accomplished through the addition of a graphene-defect agent. This is, at least part of, the basis upon which the embodiments of the present disclosure were developed to grow a CNM product by $CO_2$ electrolysis in lithium-free carbonate electrolyte(s).

In some embodiments of the present disclosure, the CNM product made according to the methods, apparatus and systems described herein above, may result in a doped CNM product. Without being bound by any particular theory, if a doping component, also referred to as a dopant, is introduced into the method, apparatus or system, then atoms of the dopant may be directly incorporated into various of the graphitic structures of the CNM product. When atoms of the doping component are directly introduced into the CNM product, as it is being built in situ upon the cathode, the resulting doped CNM product has desired chemical physical properties that are different than a CNM product (a non-doped CNM product) that does not include atoms of the doping component. Without being bound by any particular theory, the doping component may include at least one material with a group IIIA element, a non-carbon group IVA element, a group VA element, a group VIA chalcogenide element, or at least one material with gold, platinum, iridium, iron or other row 4, 5, or 6 metals. In some embodiments of the present disclosure, the doping component comprises: a chemical species with oxygen atoms, halide atoms, one or more of nitrate, a phosphate, a thiophosphate, a silicate, a thionyl chloride, a sulfur chloride, a silicon chloride, a thiophosphate, a thionyl nitrate, a silicon nitrate, a silicon nitrite, a sulfur oxide and a nitrous oxide gas. Without being bound by any particular theory, the desired chemical properties of the doped CNM product may include: a greater electrical conductivity (as compared to a non-doped CNM product), enhanced electrical charge storage (as compared to a non-doped CNM product), a heterogeneous catalytic property, a homogeneous catalytic property, a fuel cell catalytic property, an aerobic oxidation catalytic property, an enhanced reaction activity property and any combination thereof. The desired physical chemical properties of the doped CNM product made according to the embodiments of the present disclosure may have a wide variety of applications, such as: a catalysts, heavy metal removal, energy storage, sorption applications, batteries, ultra-sensitive sensors and combinations thereof.

In some embodiments of the present disclosure, the CNM product made according to the methods, apparatus and systems described herein above, may result in a magnetic CNM product. For clarity, a magnetic CNM product is one that is physically movable with a magnetic field. Without being bound by any particular theory, if a magnetic additive component, is introduced into the method, apparatus or system, then a carbide-driven growth of the various of the graphitic structures within the magnetic CNM product occurs. In some embodiments of the present disclosure, the magnetic additive component comprises at least one of a magnetic material addition component, a carbide-growth component and any combination thereof. In some embodiments of the present disclosure, the magnetic material addition component is wherein the magnetic material additive component is one or more of iron, nickel, cobalt, gadolinium, samarium, neodymium, steel and alloys comprising one or more magnetic materials with ferromagnetic properties, paramagnetic properties, diamagnetic properties and any combination thereof. In some embodiments of the present disclosure, the iron-based additive is one or more of cast iron powder, iron metal, steel, stainless steel, an iron containing metal alloy, an iron oxide, FeO, $Fe_2O_3$, $Fe_3O_4$, or an iron containing salt. Within the magnetic CNM product, the magnetic additive component is incorporated or formed as one or more nodules, that may be covered in one or more layers of graphitic carbon, on the magnetic CNM product. In some embodiments of the present disclosure, the carbide-growth component may be a metal carbide, such as: iron carbide, a nickel carbide, a cobalt carbide; a zirconium carbide, a chromium carbide, a tantalum carbide, a hafnium carbide and any combination thereof. In some embodiments of the present disclosure, the carbide-growth component may be a non-metal carbide, such as silicon carbide, a germanium carbide and any combination thereof. The magnetic additive component may be added to the methods, apparatus and systems of the present disclosure, as a chemical additive or it may originate from one or more walls of the electrolysis cell, from the anode, from the cathode, the electrolyte media and any combination thereof.

EXAMPLES

The constituents of the molten electrolyte mixtures described herein are commercially available: barium carbonate ($BaCO_3$; Alfa Aesar, about 99.5% pure), lithium carbonate ($Li_2CO_3$; Alfa Aesar, about 99% pure), sodium carbonate ($Na_2CO_3$; Alfa Aesar, about 99% pure), lithium oxide ($Li_2O$; Alfa Aesar, about 99.5% pure), and barium oxide (BaO; Alfa Aesar, about 97% pure).

The CNM product made by the examples below were washed (with either deionized water or up to 6 M HCl) to remove excess electrolyte, separated from the washing solution, and analyzed by PHENOM Pro-X Energy Dispersive Spectroscopy on the PHENOM Pro-X scanning electron microscope (SEM); by high resolution FEI Tenco LV SEM, and/or by FEI Talos F200X transmission electron microscope (TEM).

Raman spectroscopy was measured with a LabRAM HR800 Raman microscope (HORIBA) with 532.14 wavelength incident laser light, with a high resolution of 0.6 $cm^{-1}$.

Example 1

In order to make CNM product an electrolysis reaction was conducted in an electrolysis cell that comprised a tubular vessel, an anode and a cathode. The tubular vessel was made of pure alumina (commercially available from AdValue, approximately 99.6% pure alumina) and it had a closed end.

The anode was configured to generate oxygen during the electrolysis reaction. The anode was made of Nichrome and it was configured into a substantially flat coil.

The cathode was made of brass and it was also configured into a substantially flat coil.

In this Example 1, the electrolyte was lithium carbonate ($Li_2CO_3$) with 2% (on a weight basis, % wt) lithium oxide ($Li_2O$). The electrolyte was heated to about 770° C. and positioned within the tubular vessel of the electrolytic cell between the anode and the cathode.

The electrolysis reaction was initiated by applying an electric current of about 0.5 amp (A) at a substantially constant current density of about 0.14 $A/cm^2$.

Carbon dioxide from the air was directly captured by the molten electrolyte during the electrolysis reaction.

After about 4 hours, the electric current was turned off and the electrolysis reaction was stopped. The cathode was removed from the tubular vessel and allowed to cool and the solid CNM product was removed from the cathode.

FIG. 3 shows scanning electron microscope (SEM) images of the CNM product that included carbon nanotubes (CNTs). FIG. 3B shows CNTs collected from the side of the cathode that did not face the anode, also referred to as the rear face. In particular, a piece of a multilayer graphene sheet which first forms on the cathode, and from which the CNTs grew, is evident in a manner consistent with the tip growth mechanism of FIG. 2A. The CNTs were grown in a manner consistent with the tip growth mechanism. The CNM product was about 98% uniform CNTs as determined by visual inspection of multiple SEMs images.

The scale bars in FIG. 3A, 3B, 3C and 3D are 200 µm, 200 µm, 10 µm and 10 µm respectively. The scale bars in FIG. 3E, 3F and 3G are 200 µm, 3 µm and 1 µm, respectively.

A useful gauge of the number of defects in graphitic structures is provided by Raman spectroscopy, as measured by the ratio of the intensity of the D (disorder-induced band) peak, $I_D$, located at 1350 $cm^{-1}$ relative to the intensity of the G (high frequency $E_{2g}$ for order mode band) peak located at 1575 $cm^{-1}$.

The concentration of oxide in a molten carbonate may be determined by its equilibrium with the partial pressure of $CO_2$ as exemplified for $CO_2$ in the air over molten $Li_2CO_3$. For example, at 750° C., molten $Li_2CO_3$ has an equilibrium concentration of 0.3 m oxide (m=moles/kg $Li_2CO_3$) under 750° C. air. Increase in the oxide concentration can be achieved by changing the system temperature or pressure.

It has previously been shown that CNTs grown in pure, molten $Li_2CO_3$, with its intrinsic, equilibrium induced oxide concentration of 0.2 m, exhibit an $I_D/I_G$=0.4, while those grown in 4 m $Li_2O$ in $Li_2CO_3$ (10.6 wt % $Li_2O$) exhibit an $I_D/I_G$=1.0. Raman spectra of the 2 wt % $Li_2O$ grown exhibit an $I_D/I_G$=0.7, and the CNTs are generally more straight and less tangled than those grown in the 10.6 wt % lithium carbonate electrolyte. Presumably the structure and organization of these CNTs was due to the lower concentration of out of plane $sp^a$ bonding compared to the conventional graphitic $sp^2$ carbon bonding. The ratio of 0.70 is consistent with that of commercial CNTs.

In the left and right portions of FIG. 2C, the D and G Raman peaks of CNTs are evident for CNTs either grown by electrolysis in electrolytes with (right) or without (left) lithium oxide added to a lithium carbonate electrolyte. The lithium carbonate electrolysis product used in the right Raman spectrum is produced with an electrolyte lithium oxide concentration of 4 m $Li_2O$ (4 m $Li_2O$=12 wt % $Li_2O$ per wt $Li_2CO_3$). The large relative height of the D peak is indicative of a larger number of defects of carbon nanotubes grown in the presence of the added oxide. This increase in the $I_D/I_G$ ratio with oxide addition during the electrolytic growth of CNTs is consistent with greater defects and improved reversible intercalation of Li-ions into the CNTs when used as an anode in battery applications.

Example 2

This example used many of the same steps as Example 1, with one exception being the use of an electrolyte that was lithium free.

The electrolytic cell comprised a tubular vessel made of essentially pure alumina with an internal volume of about 100 ml. The anode was a horizontally aligned coil (with an area of about 5 $cm^2$) of nickel wire that was vertically spaced about 1 centimeter (cm) above a cathode made of galvanized-steel wire. The cathode was also a horizontally aligned coil of wire (with an area of about 5 $cm^2$, as shown in FIG. 4A and FIG. 4B).

The electrolyte for this Example 2 was a ternary mixture of 1:1 wt % $Na_2CO_3$ to $BaCO_3$, which has a low melting point in accordance with FIG. 1, and containing 2 m (23 wt %) barium oxide (BaO). The electrolyte was heated to about 750° C. and positioned within the tubular vessel between the anode and the cathode. Carbon dioxide from the air was directly captured by the molten electrolyte during the electrolysis reaction.

An electric current of about 0.5 A was applied to the anode and cathode, at a substantially constant current density of about 0.1 $A/cm^2$ to initiate the electrolysis reaction.

After about 4 hours of the electrolysis reaction, the electric current was stopped and the cathode was removed from the tubular vessel and allowed to cool. The CNM product was removed from the cathode and washed to remove excess electrolyte. The CNM product was washed with either deionized water DI water or up to 6 molar hydrochloric acid. It was observed that both types of washing yielded a similar CNM product, but the acid wash accelerated the washing. The washed CNM product was then separated from the washing solution by either paper filtration or centrifugation. It was observed that both separation approaches yielded similar CNM product, but use of a centrifuge accelerated the separation step.

In order to characterize the structural morphology of the CNM product, the product was imaged using SEM imaging. FIG. 4D and FIG. 4E show SEM images of the CNM product as containing a discernable, but minor, CNT product that included about 5% curled CNTs. The remainder of the CNM product was a mix of carbon nano-onions and nano-platelets. The scale bars in FIG. 4D and FIG. 4E are both 10 µm.

After finishing the electrolysis reaction, the washed nickel electrode appeared unchanged. However, as seen in FIG. 4C, the electrolyte appeared green both in the tubular vessel and congealed over the removed cathode, which could be evidence of nickel oxidation and buildup in the electrolyte. To avoid this corrosion, nickel chromium alloy anodes may be useful.

Example 3

This example used many of the same steps as Example 2, including the use of an electrolyte that was lithium free. The primary difference with Example 3 was the materials used in the anode and cathode.

The electrode material has a substantial effect on the yield and morphology of CNTs grown by molten carbonate electrolysis. Using a lithium carbonate electrolyte, it is known that Monel cathodes and Nichrome anodes produce the longest CNTs by $CO_2$ electrolysis to date. These CNTs are uniform and produced at high yield. Without being bound by any particular theory, both nickel and chromium can act as effective nucleating agents for CNT growth, and it has been proposed that the nickel promotes CNT growth and the chromium promotes repair to allow continued CNT growth.

The electrolytic cell comprised a tubular vessel made of essentially pure alumina with an internal volume of about 100 mL. The anode was a horizontally aligned coil (with an area of about 5 cm$^2$) of Nichrome wire that was vertically spaced about 1 cm above a cathode made of Monel wire (see FIG. 5A). The cathode was also a horizontally aligned coil of wire (with an area of about 5 cm$^2$).

The electrolyte for this Example 3 was a mixture of 1:1 wt % $Na_2CO_3$: $BaCO_3$, without any BaO being added. The electrolyte was heated to about 770° C. and positioned within the tubular vessel. Carbon dioxide from the air was directly captured by the molten electrolyte during the electrolysis reaction.

The electrolysis reaction was initiated by applying an electric current of about 0.5 A, at a constant current density of about 0.1 A/cm$^2$, to the anode and cathode.

After about 4 hours of the electrolysis reaction, the electric current was turned off and the cathode was removed from the tubular vessel and allowed to cool. FIG. 5B shows the electrodes after the electrolysis reaction was stopped. There is a congealed electrolyte (clear white matter) but there was little to no evidence that the anode was corroded. The CNM product was then removed from the cathode and washed to remove excess electrolyte.

As shown in the SEM images of FIG. 5C, FIG. 5D and FIG. 5E, the CNM product contained about 10% of discernable short and curly CNTs. The scale bars in FIG. 5C, FIG. 5D and FIG. 5E are 80 µm, 30 µm and 20 µm, respectively.

Example 4

Without being bound by any particular theory, unsuccessful attempts to synthesize CNTs at high yield in non-lithiated electrolytes may correlate to (i) the intrinsically higher resistivity of lithium-free molten electrolytes resulting in lower mobility and constrained growth, and (ii) an insufficient defect size in the growing CNT walls to allow the facile exchange of ions larger than Li$^+$ ions. Specifically, molten $Li_2CO_3$ not only requires lower thermodynamic electrolysis energy, but in addition has higher conductivity (6 Siemen cm$^{-1}$) than that of $Na_2CO_3$ (3 Siemen v) or $K_2CO_3$ (2 Sieman cm$^{-1}$) near the melting point. Higher conductivity is desired as it may lead to lower electrolysis ohmic losses and increases the mobility of reactants and prevents constraints to mass diffusion. Furthermore, lithium mobility within the carbon nanotube growth site appears to contribute to the observed high yield carbon nanotube growth rate in lithium-containing media.

Figures 9, 9A, 9B, 9C:
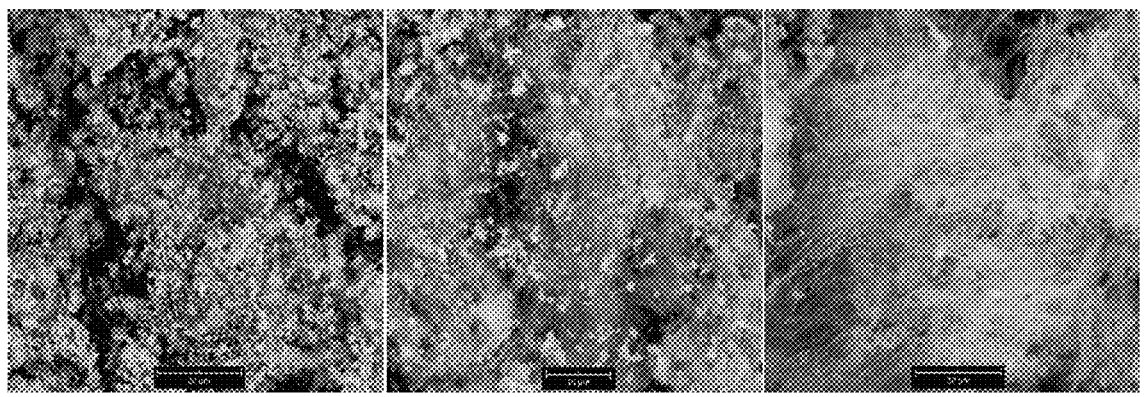

In this example, synthesis of a higher yield of CNTs in a lithium-free electrolyte is shown by of the electrolysis product of 1:1 $Na_2CO_3$: $BaCO_3$ electrolyte (without added BaO), grown at half the current density, 0.05 A/cm$^2$. The electrolysis uses a planar, rather than a coiled, and brass rather than Monel cathode, and neither change in the shape or alloy choices was observed to substantially affect the lithium-free CNT growth. As seen from representative SEM images in in FIGS. 9A-9C, the product contains 80-90% CNTs that appear to be grainy and not smooth. The scale bars in FIG. 6A, 9B, and 9C are 80 µm, 50 µm, and 20 µm, respectively. FIG. 6D shows energy-dispersive X-ray spectroscopy results from the product obtained in this example, showing 92.2% C, 3.6% Ba and 4.2% Na. The disabled element 0 is present as residual sodium and barium carbonate.

Example 5

In this example, an additional concentration of a transition metal nucleation agent was used for carbon nanotube synthesis in lithium-free electrolytes. The electrolysis was conducted at high current density of 0.2 A/cm$^2$, but yielded a very high-quality carbon nanotube product through the addition of 0.08 wt % $Fe_2O_3$ directly to the 1:1 $Na_2CO_3$: $BaCO_3$ electrolyte. As seen in the FIG. 7, the carbon nanotube product is smooth, has a purity of 80-90% CNT, and has a high CNT length to diameter aspect ratio. TEM of the products from the non-lithiated electrolytes (not shown) exhibit the regular CNT morphology of a hollow cored structure with walls comprised of distinct concentric cylindrical graphene layers as previously observed in CNTs formed from the electrolysis of $CO_2$ in a lithiated carbonate electrolytes. The separation between graphene layers in graphite is about 0.335 nm, and can vary near this value in multi-walled CNTs. The scale bars of SEM images shown in FIGS. 7A-7F are respectively 200 µm, 30 µm, 20 µm, 20 µm, 10 µm and 8 µm. While a brass cathode was used in this example, other cathodes, such as Monel steel, galvanized steel, copper, and nickel alloys may also be effective.

Figure 8:
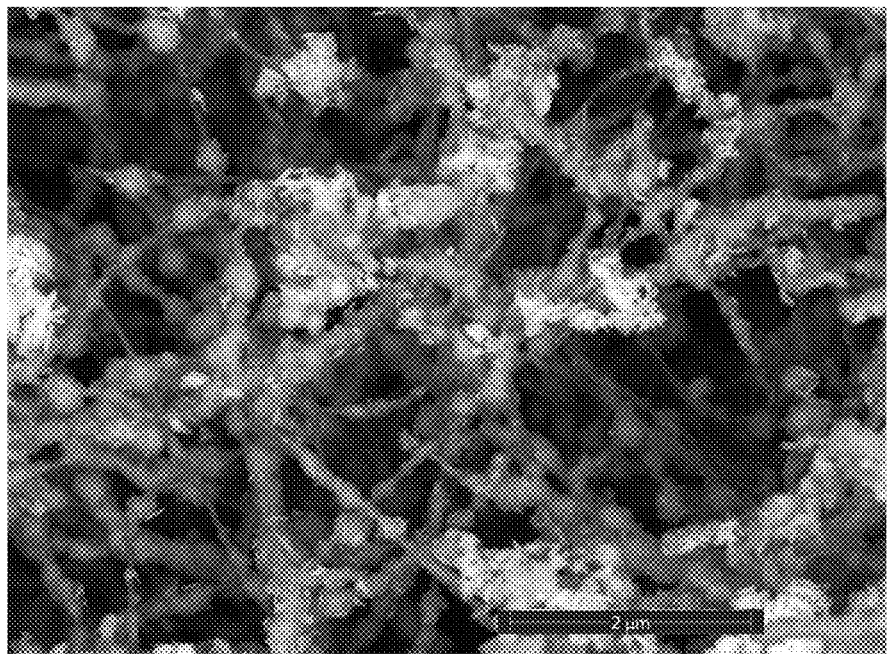
FIG. 8 shows SEM images of the washed product of electrolysis in a 770° C. 2.5:1 wt % $Na_2CO_3$ to $BaCO_3$, electrolyte at 0.1 $A/cm^2$ with 0.1 wt % $Fe_2O_3$ with a nichrome anode and a brass cathode.

The high CNT yield shown in FIG. 7 is observed over a range of current densities, a range of $Fe_2O_3$ concentrations, various cathodes, and over a range of relative weight ratios of $Na_2CO_3$ and $BaCO_3$ in the electrolyte. For example, an electrolysis at a lower current density of 0.1 A/cm$^2$, in a 770° C. electrolyte ranging from 2.5:1 to 1:2.5 wt % $Na_2CO_3$ to $BaCO_3$, and containing 0.1 wt % $Fe_2O_3$, was observed to also have a purity of 80-90% CNT in the product. However, as seen in the high resolution high magnification SEM image of FIG. 8 (scale bar 2 µm), the product of such a sodium carbonate enriched electrolyte deviates considerably form the traditional smooth, cylindrical CNT morphology seen in FIG. 9, with bead-like nodules and platelets evident along the tube morphology.

Example 6

In this example, the effect of a transition metal nucleation agent on the quality of the carbon nanomaterial product was demonstrated. The electrolysis conditions used were similar to those described in Example 6 but instead of a 0.08 wt % $Fe_2O_3$ additive, an additive of $Fe_2O_3$ and $Cr_{2O3}$ (each at 0.04 wt %) was used in the lithium-free electrolysis. Chromium has been used as an effective CNT growth nucleating agent. However, when used as an additive in lithium-free electrolysis, the reaction product was not as good as obtained with only $Fe_2O_3$, as it consisted of approximately 60% CNTs (see FIG. 9; scale bars of FIGS. 9A, 9B, and 9C are 20 μm, 10 μm, and 10 μm, respectively).

Example 7

Figures 10, 10A, 10B, 10C:
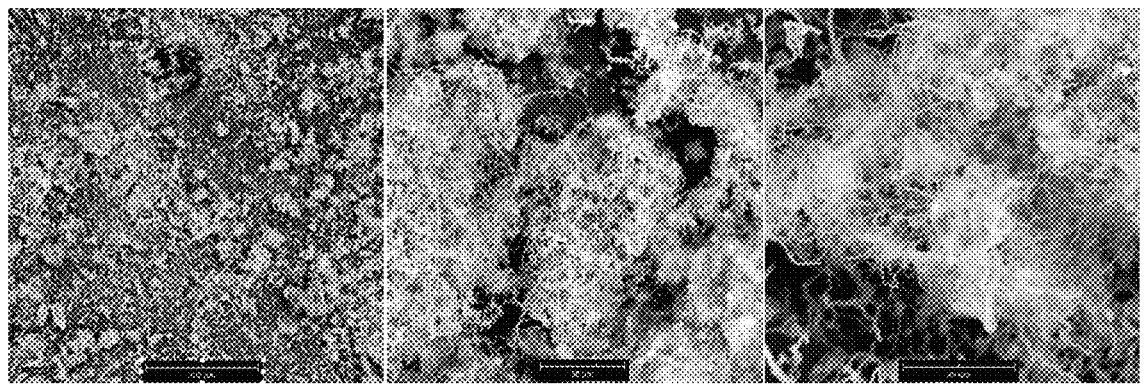

In this example, 30 wt % BaO was added to the 1:1 $Na_2CO_3$: $BaCO_3$, electrolyte, and the electrolysis was conducted at 0.1 A/cm$^2$ using a NiCr anode and a Monel cathode. As shown by example in FIG. 10, the addition of oxide, to induce useful 2p$^2$ defects in the carbon nanotube walls, was also found to improve the quality of carbon nanotubes synthesized in lithium-free electrolytes. The scale bars of FIGS. 10A, 10B, and 10C are 200 μm, 30 μm, and 20 μm.

Example 8

An electrolysis at a lower current density of 0.05 A/cm$^2$, in a 770° C. 1:1 wt % $Na_2CO_3$ to $BaCO_3$, electrolyte containing both 30 wt % BaO and with 0.04 wt % $Fe_2O_3$ and 0.04 wt % $Cr_{2O3}$, between a NiCr anode and brass cathode is observed to have a much lower yield (<20%) of CNT in the product. This suggests that the beneficial effects of (i) the addition of higher quantities of specific transition metal nucleation agents, (ii) the introduction of oxides, and (iii) application of low current density to increase product yield in a lithium-free electrolyte may not work in combination.

Without being bound by any particular theory, the embodiments and examples described herein provide a high-yield approach to produce CNTs directly from atmospheric $CO_2$ by an electrolysis reaction that employs an electrolyte that is lithium-free. This lithium-free approach may be enhanced by adding one or more graphene-defect agents to the electrolyte, which suggests that sufficiently large defects and vacancies in the CNT walls, as caused by the graphene-defect agent, such as an oxide, may be required to permit intercalation of ions larger than lithium cations through the walls of the growing CNT.

The introduction of oxides (such as, for example, BaO) and additional transition metal nucleation agent (such as, for example, $Fe_2O_3$), may remove an electrolyte conductivity impediment (for example to allow for higher conductivity), which may provide more energy favorable pathways for the CNM product to form, and may affect stability of certain species formed in lithium-free electrolysis. Without modification of lithium-free electrolyte electrolysis conditions a CNM product may still be observed but at low yields. However, over 80% yield of CNT may be observed using sodium/barium carbonate, lithium-free, electrolyte under conditions of either (i) the addition of higher quantities of specific transition metal nucleation agents, such as $Fe_2O_3$; (ii) the introduction of oxides, such as BaO, at high concentrations to induce greater defects in the growing CNTs; or (iii) low current density to overcome the conductivity issues. While high yield growth of carbon nanotubes are exemplified herein, the systematic variations of the molten electrolysis electrochemical configuration disclosed herein may provide a pathway to alternative growth of other carbon nanomaterials such as carbon nanofibers, carbon nano-onions, hollow carbon nano-spheres, carbon nano-platelets or graphene in a lithium-free electrolyte.

Example 9

Lithium salts are exemplified by, but are not limited to, lithium carbonate, lithium oxide, lithium silicate, lithium nitrate, lithium sulfate, lithium phosphate, lithium borate, a lithium halide or combinations thereof. Examples of lithium halides include, but are not limited to: lithium chloride, lithium bromide, lithium iodide or combinations thereof. A low concentration of a lithium salt may add an improved property, without adding a substantial lithium cost to the electrolyte. Examples of improved properties are exemplified by, but not limited to, an increase of the electrolyte conductivity and/or the improved purity or selectivity of the carbon nanomaterial products. The ability to increase electrolyte conductivity through the addition of a lithium salt is evident in the relative conductivities of the purity of alkali carbonates of 6, 3 and 2 S/cm respectively for lithium carbonate, sodium carbonate and potassium carbonate. As with barium oxide, and unlike calcium oxide, lithium oxide is also highly soluble in carbonate electrolytes. The CNM product is also evident with the addition of 1% or 5% of either lithium carbonate or lithium borate to the electrolytes of Examples 4, 5 and 7. The inclusion of the lithium borate in the electrolyte can form boron doped carbon nanotubes.

The electrolytes made as a mixture of sodium carbonate and barium carbonate are an order of magnitude less expensive than comparable lithium-carbonate based electrolytes. The use of an electrolyte that is a binary mixture (for example, sodium/barium carbonate) and/or an electrolyte that is a ternary mixture (for example, Na/Ba carbonate plus barium oxide) and that can provide an electrolyte melting point within the optimal range for $CO_2$ to carbon nanomaterial growth of between about 700° C. to about 800° C. Lithium-free electrolysis may be performed using a planar, rather than a coiled, and brass, rather than Monel, cathode without substantially affecting lithium-free CNT growth.

We claim:

1. A method for producing a CNM product comprising:
   (a) heating a lithium-free carbonate electrolyte to obtain a molten carbonate electrolyte;
   (b) positioning the molten carbonate electrolyte between an anode and a cathode in an electrolytic cell;
   (c) applying an electrical current to the cathode and the anode in the electrolytic cell; and
   (d) collecting the carbon nanomaterial (CNM) product from the cathode,
   wherein the CNM product comprises graphitic carbon structures of a nanoscale, and
   wherein the lithium-free carbonate electrolyte is free of potassium and calcium and the lithium-free carbonate electrolyte comprises a binary mixture of two carbonates or a ternary mixture of two carbonates and an oxide.

2. The method of claim 1, further comprising a step of employing one or more non-lithium facilitation elements.

3. The method of claim 2, wherein the one or more non-lithium facilitation elements are: (i) enhancing transition metal nucleation by adding one or more transition metal nucleation agents, (ii) adding one or more defect inducing agents, (iii) reducing an electrolyte conductivity impediment element, and (iv) any combination thereof.

4. The method of claim 3, wherein the step of adding one or more defect inducing agents comprises a step of introducing one or more oxides into the lithium- free carbonate electrolyte.

5. The method of claim 4, wherein the one or more oxides is one or more of barium oxide, sodium oxide, iron oxide, cobalt oxide, lithium oxide or any combination thereof.

6. The method of claim 4, wherein the step of introducing the one or more oxides comprises:
   (a) introducing an alkali oxide, an alkali earth oxide, a metal oxide, a non-metal oxide, sodium oxide, barium oxide, or any combination thereof;
   (b) oxidizing the anode; or
   (c) changing a temperature of the lithium-free carbonate electrolyte.

7. The method of claim 3, wherein the one or more transition metal nucleation agents comprise a transition metal salt that is added to the electrolyte.

8. The method of claim 7, wherein the transition metal salt is one or more of a salt that comprises: iron, chromium, nickel, copper; manganese, titanium, zirconium, molybdenum, tantalum, tungsten, silver, cadmium, tin, ruthenium, vanadium, cobalt or any combination thereof.

9. The method of claim 3, wherein the step of reducing the electrolyte conductivity impediment element comprises inducing one or more graphene defects within the CNM product or decreasing a current density of the electrical current.

10. The method of claim 9, wherein the step of inducing graphene defects comprises adding one or more foreign adatoms, one or more substitutional impurities or any combination thereof.

11. The method of claim 1, further comprising a step of adding an oxidative agent to induce structural defects within the CNM product.

12. The method of claim 1, further comprising a step of introducing a nanomaterial selection component in the electrolytic cell.

13. The method of claim 12, wherein the nanomaterial selection component selects for the CNM product to comprise a carbon nanotube (CNT) product, a carbon nanofiber product, a carbon platelet product, a graphene product, a carbon nano-onion product, or a hollow carbon nano-sphere product.

14. The method of claim 1, further comprising a step of adding a doping component into the electrolytic cell.

15. The method of claim 1, further comprising a step of introducing a doping component for making a doped CNM product or a step of introducing a magnetic additive component for making a magnetic CNM product.

16. The method of claim 1, wherein the lithium-free carbonate electrolyte comprises an amount of lithium that is less than about 5% on a weight basis (wt %), less than about 4 wt %, less than about 3 wt %, or less than about 2 wt %.

17. The method of claim 16, wherein the amount of lithium is present as: lithium carbonate, lithium oxide, lithium chloride, lithium bromide, lithium iodide, lithium silicate, lithium nitrate, lithium sulfate, lithium phosphate, lithium borate or any combination thereof.

* * * * *